United States Patent
Nolan et al.

(10) Patent No.: US 11,917,038 B2
(45) Date of Patent: Feb. 27, 2024

(54) METHODS AND APPARATUS TO COMPRESS PACKETS IN A COMPUTING ENVIRONMENT

(71) Applicant: Intel Corporation, Santa Clara, CA (US)

(72) Inventors: Michael Nolan, Maynooth (IE); Keith Ellis, Carlow (IE); Marcin Spoczynski, Leixlip (IE); Michael McGrath, Virginia (IE); David Coates, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/344,491

(22) Filed: Jun. 10, 2021

(65) Prior Publication Data

US 2021/0377366 A1 Dec. 2, 2021

Related U.S. Application Data

(63) Continuation of application No. 16/235,722, filed on Dec. 28, 2018, now Pat. No. 11,038,990.

(51) Int. Cl.
*H04L 29/06* (2006.01)
*G06N 20/00* (2019.01)
(Continued)

(52) U.S. Cl.
CPC .............. *H04L 69/04* (2013.01); *G06N 20/00* (2019.01); *H04L 41/0893* (2013.01);
(Continued)

(58) Field of Classification Search
CPC ... H04L 69/04; H04L 41/0893; H04L 41/142; H04L 41/145; H04L 45/742;
(Continued)

(56) References Cited

U.S. PATENT DOCUMENTS 6,590,905 B1 7/2003 Suumaki et al.
6,963,570 B1 * 11/2005 Agarwal ............... H04L 1/0057
370/395.32
(Continued)

FOREIGN PATENT DOCUMENTS

WO WO-2015062746 A1 * 5/2015 ............. H04L 47/38
WO WO-2020125988 A1 * 6/2020 ............. H04L 69/04

OTHER PUBLICATIONS

Jacobson, "Compressing TCP/IP Headers for Low-Speed Serial Links," Internet Engineering Task Force, RFC 1144, Feb. 1990, 45 pages.
(Continued)

*Primary Examiner* — Schquita D Goodwin
(74) *Attorney, Agent, or Firm* — Hanley, Flight & Zimmerman, LLC

(57) ABSTRACT

An apparatus is disclosed to compress packets, the apparatus comprising; a data analyzer to identify a new destination address and a protocol identifier of an input packet corresponding to a new destination node and a communication system between the new destination node and a source node; a compression engine to utilize a plurality of compression functions based on the new destination address and the protocol identifier and reduce a size of the input packet; a compression analyzer to identify a reduced packet and a compression function identifier corresponding to the reduced packet, the compression function identifier associated with one of the compression functions; and a source modifier to construct a packet to include the compression function identifier by modifying unregistered values of a protocol identifier by a difference associated with the compression function identifier, the packet to inform the new destination node of a compression function.

26 Claims, 9 Drawing Sheets

(51) Int. Cl.
| | |
|---|---|
| *H04L 41/0893* | (2022.01) |
| *H04L 41/14* | (2022.01) |
| *H04L 41/142* | (2022.01) |
| *H04L 45/74* | (2022.01) |
| *H04L 45/745* | (2022.01) |
| *H04L 47/38* | (2022.01) |
| *H04L 69/04* | (2022.01) |
| *H04L 67/06* | (2022.01) |
| *H04L 67/568* | (2022.01) |
| *H04L 69/22* | (2022.01) |

(52) U.S. Cl.
CPC .......... *H04L 41/142* (2013.01); *H04L 41/145* (2013.01); *H04L 45/742* (2013.01); *H04L 45/745* (2013.01); *H04L 47/38* (2013.01); *H04L 67/06* (2013.01); *H04L 67/568* (2022.05); *H04L 69/22* (2013.01)

(58) Field of Classification Search
CPC ....... H04L 45/745; H04L 47/38; H04L 67/06; H04L 67/2842; H04L 69/22; H04L 67/568; H04L 41/0853; G06N 20/00
USPC .......................................... 709/247
See application file for complete search history.

(56) References Cited

U.S. PATENT DOCUMENTS

| | | | | |
|---|---|---|---|---|
| 10,454,498 | B1 | 10/2019 | Mao | |
| 10,694,002 | B1* | 6/2020 | Savir | ............... H04L 67/01 |
| 10,827,039 | B1* | 11/2020 | Dandekar | ............... H04L 69/04 |
| 10,893,076 | B2* | 1/2021 | Skuratovich | .......... H04L 69/161 |
| 11,038,990 | B2* | 6/2021 | Nolan | ................. H04L 45/745 |
| 2008/0098129 | A1 | 4/2008 | Niddam et al. | |
| 2009/0161547 | A1* | 6/2009 | Riddle | .................... G06F 9/526 |
| | | | | 370/395.7 |
| 2011/0249610 | A1* | 10/2011 | Ho | ........................ H04L 69/04 |
| | | | | 370/328 |
| 2012/0155375 | A1* | 6/2012 | Zhu | ........................ H04L 69/04 |
| | | | | 370/315 |
| 2013/0145047 | A1* | 6/2013 | Short | ..................... H04L 69/04 |
| | | | | 709/247 |
| 2014/0351229 | A1 | 11/2014 | Gupta | |
| 2015/0085876 | A1* | 3/2015 | Chhatriwala | ......... H04W 28/06 |
| | | | | 370/465 |
| 2015/0286701 | A1 | 10/2015 | Wideman | |
| 2015/0304441 | A1* | 10/2015 | Ichien | ................. H04L 67/5651 |
| | | | | 709/247 |
| 2016/0092112 | A1* | 3/2016 | Akgun | ...................... G06F 9/44 |
| | | | | 711/154 |
| 2016/0246512 | A1 | 8/2016 | Li | |
| 2016/0380900 | A1 | 12/2016 | Kolhi et al. | |
| 2017/0163694 | A1* | 6/2017 | Skuratovich | ........ H04L 67/5651 |
| 2017/0195462 | A1 | 7/2017 | Kfir et al. | |
| 2017/0272555 | A1* | 9/2017 | Kwon | .................... H04L 69/322 |
| 2017/0279865 | A1 | 9/2017 | Iguchi et al. | |
| 2017/0295111 | A1* | 10/2017 | Sadowski | .......... G06F 15/7825 |
| 2018/0139650 | A1* | 5/2018 | Kwon | ................. H04W 28/065 |
| 2019/0304477 | A1* | 10/2019 | Wojcieszak | ............. G10L 19/24 |
| 2020/0042219 | A1 | 2/2020 | Wang et al. | |
| 2021/0250427 | A1* | 8/2021 | Zhang | ..................... H04L 69/04 |

OTHER PUBLICATIONS

Shacham et al., "IP Payload Compression Protocol (IPComp)," Internet Engineering Task Force, RFC 3173, Sep. 2001, 13 pages.

Wikipedia, "TCP acceleration," https://en.wikipedia.org/wikifTCP_acceleration, retrieved on Apr. 1, 2019, 2 pages.

Schreiber, "Compressed TCP/IP sessions using SSH-like tools," https://www.tldp.org/HOWTO/text/Compressed-TCP, retrieved on Apr. 1, 2019, 4 pages.

Netwrix, "The Netwrix Network Traffic Compression Service option," https://www.netwrix.com/kb/1324, retrieved on Apr. 1, 2019, 2 pages.

United States Patent and Trademark Office, "Non-Final Office Action" issue in connection with U.S. Appl. No. 16/235,722 dated Apr. 3, 2020, 22 pages.

United States Patent and Trademark Office, "Final Office Action" issue in connection with U.S. Appl. No. 16/235,722 dated Sep. 23, 2020, 25 pages.

United States Patent and Trademark Office, "Notice of Allowance" issue in connection with U.S. Appl. No. 16/235,722 dated Feb. 16, 2021. 12 pages.

* cited by examiner

METHODS AND APPARATUS TO COMPRESS PACKETS IN A COMPUTING ENVIRONMENT

RELATED APPLICATION

This patent arises from a continuation of U.S. patent application Ser. No. 16/235,722, (now U.S. Pat. No. 11,038,990) which was filed on Dec. 28, 2018. U.S. patent application Ser. No. 16/235,722 is hereby incorporated herein by reference in its entirety. Priority to U.S. patent application Ser. No. 16/235,722 is hereby claimed.

FIELD OF THE DISCLOSURE

This disclosure relates generally to data compression and, more particularly, to compress packets in a computing environment.

BACKGROUND

In recent years, network traffic has grown due to an increase in internet usage across the world. Network traffic is the amount of data moving across a network at a given point of time. Data compression is a tool used to reduce the total amount of traffic that traverses the network. Hardware compression is a type of data compression that is used to compress data utilizing application specific integrated circuits (ASICs) in which are customized for a particular use in a computer.

DETAILED DESCRIPTION

Figure 1:
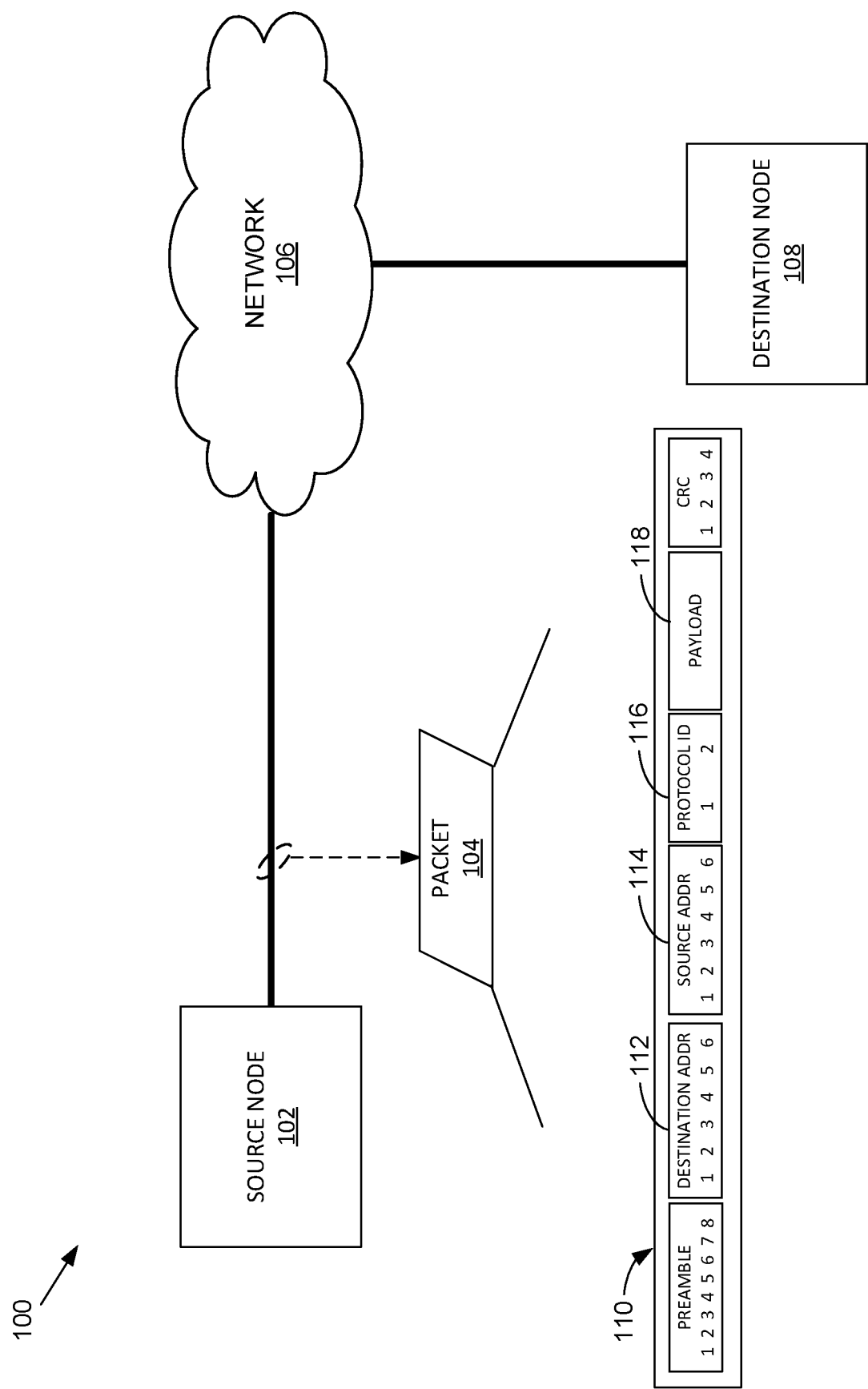
FIG. 1 illustrates example nodes that send and receive packets via a network.

Within the networking system, multiple entities (e.g., nodes) communicate with one another to provide raw data and information. In order for two or more entities to communicate with one another, a communication protocol is utilized. A communication protocol is a system of rules that allow two or more entities in a networking system to transmit information. The protocol defines the rules, syntax, semantics, and synchronization of communication and even error recovery methods if data has been changed. An example used to implement the communication protocols is the Open Systems Interconnection Model (OSI model), which partitions a network's communication system into seven layers. Examples disclosed herein focus on the second layer, also known as the data link layer, which provides node-to-node data transfer between two connected nodes. Other example models used to implement the communication protocols are the Internet protocol model (TCP/IP), which includes four layers that specifies how data should be packetized, addressed, transmitted, routed, and received, the Internetwork Packet Exchange/Sequence Packet Exchange (IPX/SPX), etc.

In some organizations, the networking system is an essential asset to support and deliver a plurality of services to clients. In a networking system, bandwidth management is pertinent to a network's operation. Bandwidth represents the capacity of communication media to transfer data from one node to a different node. The wider the path for data transmission, the more packets of information will be transmitted to the nodes. Furthermore, the bandwidth is responsible for data transfer speed and commonly used in Intranet connections. The bigger the bandwidth quota is, the higher the connection speed and hence quicker it will be to upload and download information. Some disclosed examples reduce the time on air or on wire for packet transmissions by widening the path for data transmission.

In some examples, persons skilled in the art have utilized data compression to create a larger bandwidth for data to travel. As used herein, data compression is the process of modifying, encoding, and/or converting the data in such a way that minimizes its size. For example, data compression is the same concept as when a computer ZIP compresses a file in order to send a group of documents (e.g., Microsoft Word, Microsoft Excel, Microsoft Visio, etc.) to a second computer via email in speedily manner or store it in a network location. Examples disclosed herein focus on two types of data compression which include software compression (SW compression) and hardware compression (HW compression). As used herein, SW compression is compressing data at the server of a node before it is sent to the node and HW compression is compressing data at a node by utilizing a dedicated integrated circuit of that node. Examples disclosed herein utilize a plurality of HW compression functions to compress a packet of information at a first node before the packet is sent to a second node.

Examples disclosed herein utilize methods and apparatuses to modify a protocol identifier to identify the type of communication protocol model and the type of HW compression technique used to compress a packet by replacing unregistered values in the communication protocol identifier. For example, a protocol identifier is a group of bit and/or character values that generally identify if the protocol data is to be sent by is TCP/IP, Address Resolution Protocol (ARP), Digital Equipment Corporation network (DECnet), etc. In some examples, the protocol identifier is an EtherType in an Ethernet frame. As used herein, an Ethernet frame is a unit of information transmitted between nodes of a network by the physical Ethernet.

Figure 2:
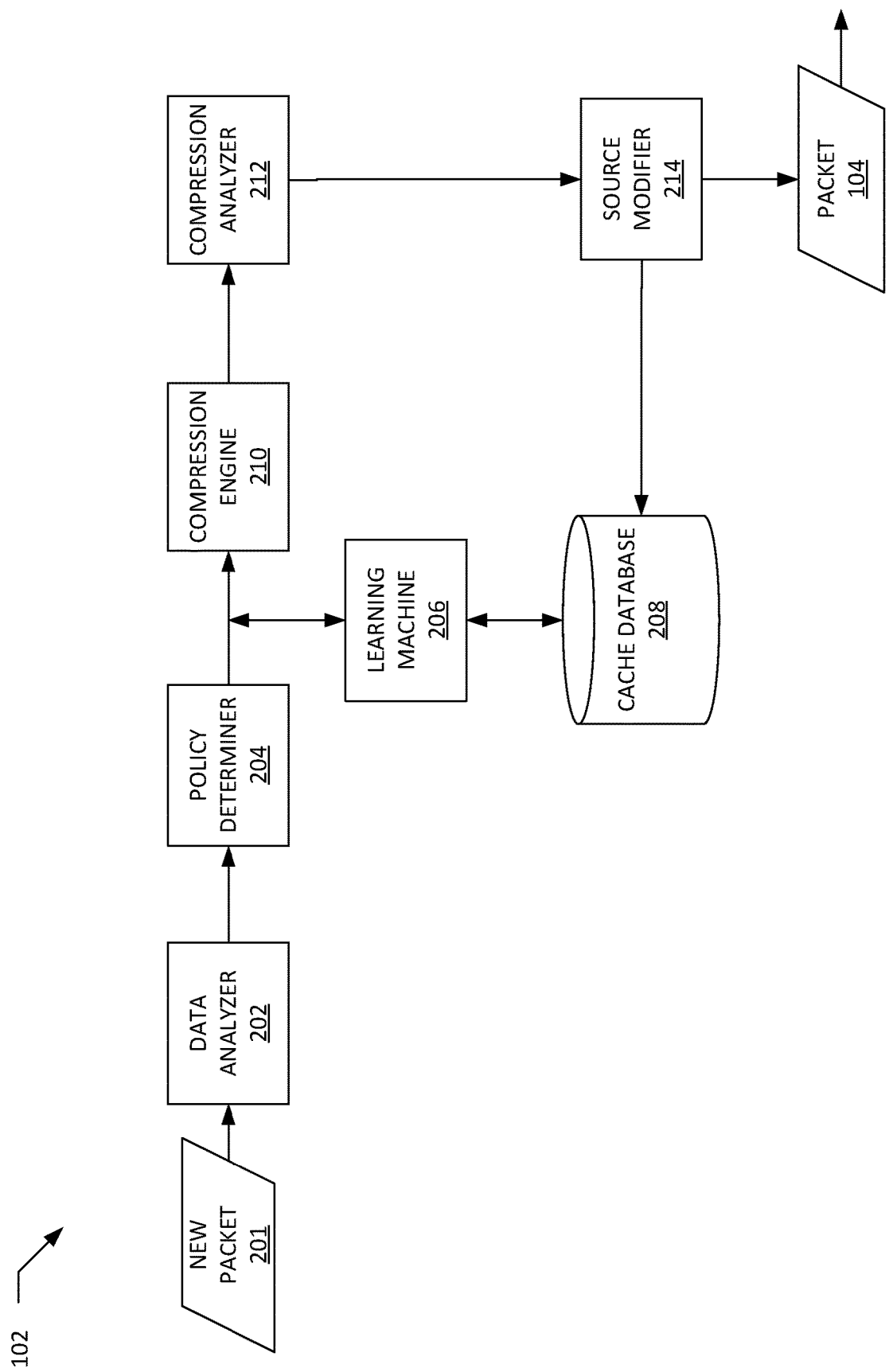
FIG. 2 is a block diagram of an example source node apparatus to compress a packet in the example environment of FIG. 1.
Figure 3:
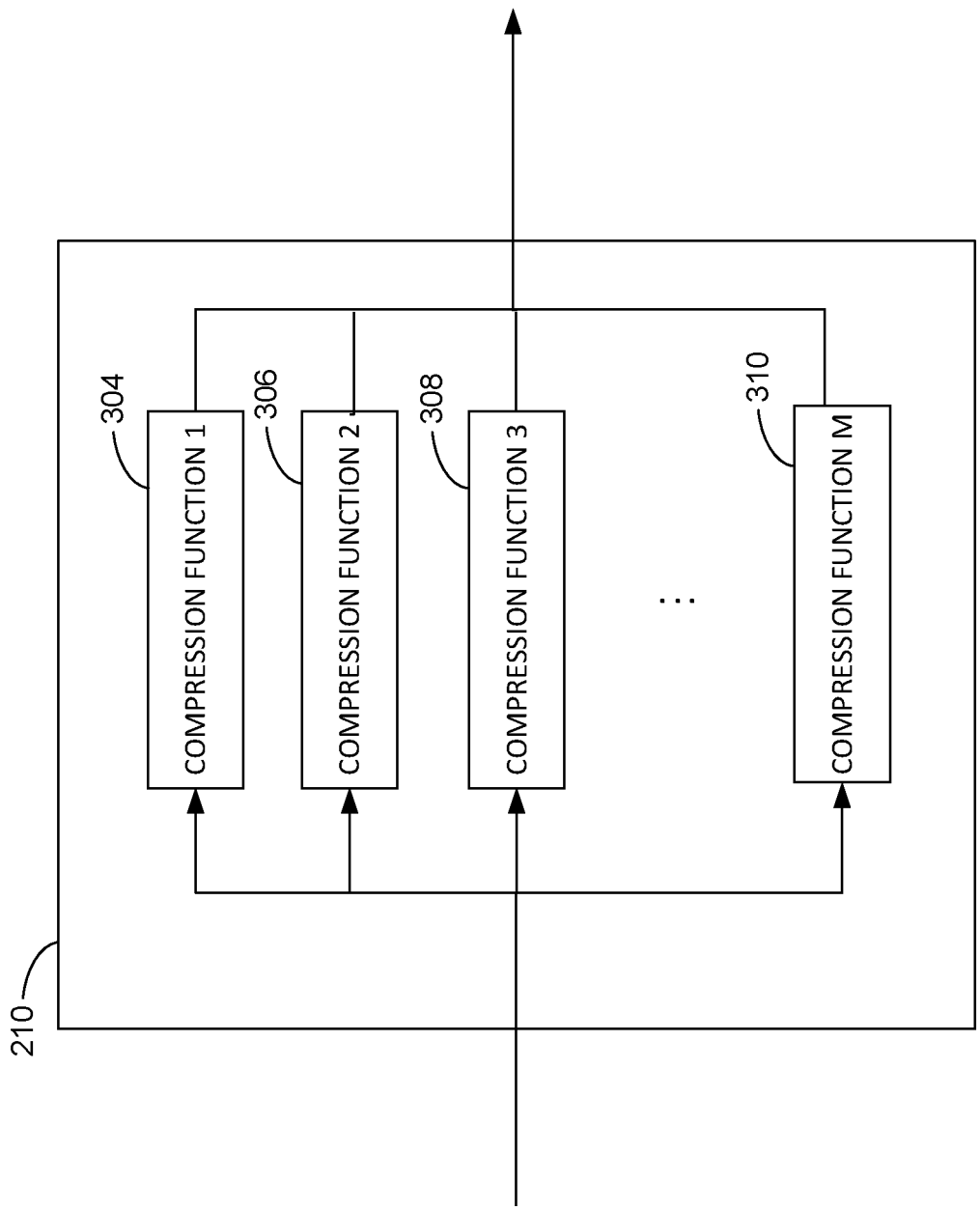
FIG. 3 is an example block diagram of an example compression engine to compress a packet to implement the example apparatus of FIG. 2.
Figure 4:
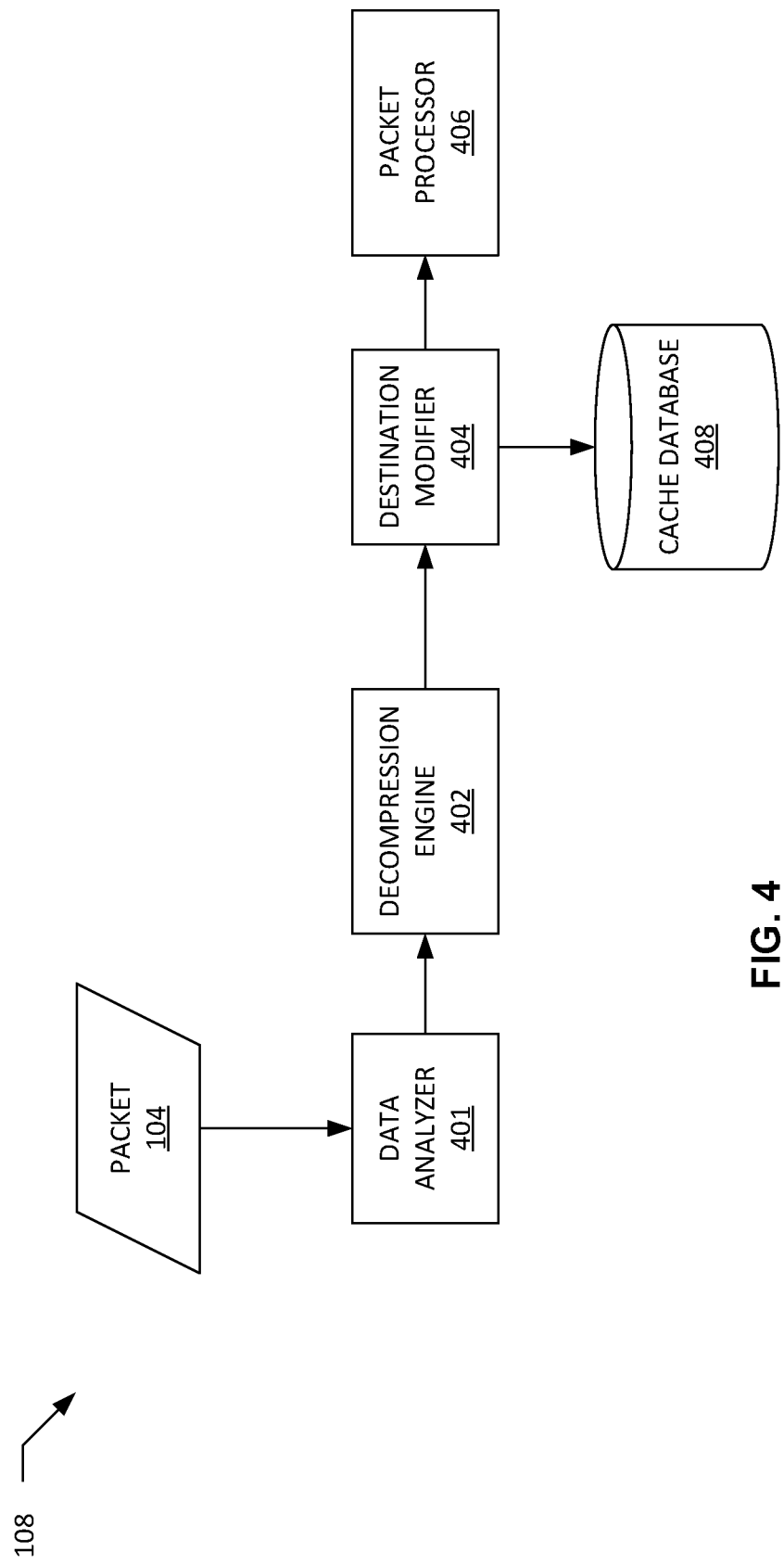
FIG. 4 is a block diagram of an example destination node apparatus to process the packet and modify a cache based on how the packet was processed.

FIG. 1 illustrates an example node environment 100 that sends and receives packets to provide information from a first node to a second node. FIGS. 1, 2, and 3 illustrate example apparatuses to implement the first node and the second node of the example node environment 100 of FIG. 1 to compress the information being sent between them and reducing the traffic across the network. For example, FIGS. 2 and 3 illustrate an example manner to implement the source node 102 of FIG. 1 and FIG. 4 illustrates an example manner to implement the destination node 108 of FIG. 1.

Turning to FIG. 1, the example node environment 100 includes an example source node 102, an example packet 104, an example network 106, an example destination node 108, an example frame 110, an example destination address 112, an example source address 114, an example protocol identifier (ID) 116, and an example payload 118.

In the illustrated example of FIG. 1 is provided with the source node 102 to compress a new packet 201 based on the destination address 112. The example source node 102 can be any physical entity (e.g., a network on a chip device, a computer, a modem, a bridge, a mobile phone, a television, etc.) that is attached to the network and is capable of creating, receiving, or transmitting information over a communication channel. The example source node 102 is the source of the data being provided to a destination. For example, the source node 102 may create information in which the destination node 108 requests such as a mobile phone user (e.g., the destination node 108) requesting streaming data from Netflix® (e.g., the source node). In some examples, the source node 102 generates a packet including a preamble, the destination address 112, the source address 114, and a cyclic redundancy check. In some examples, the source node 102 receives the packet including a preamble, the destination address 112, the source address 114, the protocol identifier 116, the payload 118, and the cyclic redundancy check.

The illustrated example of FIG. 1 is provided with the packet 104 sent by the source node 102 to provide information to the destination node 108. The example packet 104 is a formatted unit of data that may contain addresses, error detection and correction, hop counts (e.g., a number of intermediate devices through which data must pass between source and destination), length, priority (e.g., an indication of which packet queue should be used), and a payload. In some examples, the packet 104 may be an Internet Protocol (IP) packet in which includes a header and a body discussed in further detail below. In other examples, the packet 104 may be an AppleTalk packet, a Novell packet, a DECNET packet, etc. In the illustrated example, the packet 104 is being sent over a communication channel to a network. In some examples, the communication channel may be an ethernet, a wireless communication channel, etc. In some examples, the packet 104 is a jumbo packet and may be network agnostic (e.g., the packet is compatible across common systems in the network and/or compatible across multiple network protocols)

The illustrated example of FIG. 1 is provided with the network 106 to allow communication between the source node 102 and the destination node 108 and to receive, direct, and transmit data from the source node 102 to the destination node 108 and vice versa. The example network 106 may include a plurality of nodes that share and communicate resources between each other. In some examples, the network 106 is a local area network (LAN) in which the nodes are physically connected to each other. Additionally or alternatively, the example network 106 could be a wireless local area network (WLAN), a home area network (HAN), a storage area network (SAN), an enterprise private area network, etc.

The illustrated example of FIG. 1 is provided with the destination node 108 to receive the packet 104 of information from the source node 102 via the network 106 and process the packet 104. For example, the destination node 108 may receive the packet 104 from the source node 102 that includes an upgrade bundle to upgrade a software version the destination node 108 is operating at. The example destination node 108 may be any type of physical entity such as a computer, a mobile phone, a modem, etc., that can receive and process data.

The illustrated example of FIG. 1 is provided with the frame 110 to encapsulate the data in the packet 104 and transmit the packet 104 to the destination node 108. The frame in network and telecommunications is a unit of transmission in a link layer protocol which consists of a header followed by a packet. For example, the frame 110 includes a preamble (e.g., a signal used in network communications to synchronize transmission timing between two or more nodes), the destination address 112 and the source address 114 (e.g., parts of the header), the protocol ID 116, the payload 118, and a cyclic redundancy check (CRC) (e.g., detects changes in raw data). In some examples, hardware computational elements of the source node 102 generate the CRC based on the protocol ID 116 and payload 118, as it checks the payload 118 to detect any errors or changes in the included data. These parts of the frame 110 are used to transmit the packet 104 from the source node 102 to the destination node 108. In some examples, the frame 110 may be an Ethernet frame, a Point-to-Point Protocol frame, a Fibre Channel frame, a V.42 modem frame, etc.

In the illustrated example of FIG. 1, the frame 110 is provided with the destination address (destination addr) 112 to inform the network 106 where the packet 104 is to be provided to. For example, the destination address 112 is six octets in length and is contained in the header of the frame 110. As used herein, an octet is a unit of digital information that consists of eight bits. In some examples, the destination address 112 may contain a plurality of values that correspond to one or more destination nodes. The example digital information in the destination address 112 may be any value such as a number, a character, etc.

In the illustrated example of FIG. 1, the frame 110 is provided with the source address (source addr) 114 to inform the destination node 108 of the address that sent the packet 104. For example, the destination node 108 may receive a packet 104. The packet 104 may include information that requires a response. If the information included in the example packet 104 requires a response, the destination node 108 has been provided with the source address 114 in which allows the destination node 108 to respond to the information provided in the example packet 104. In some examples, the source address 114 is also six octets in length (e.g., 48 bits) and may include any types of values such as numbers, characters, etc.

In the illustrated example of FIG. 1, the frame 110 is provided with the protocol identifier 116 to identify the protocol type encapsulated in the payload 118 of the frame 110. The example protocol identifier 116 is two octets (e.g., 16 bits) in length and is utilized by the data link layer of the OSI model to determine what protocol type to provide the payload 118 to on the destination node 108. The example protocol identifier 116 may be the hexadecimal value 0x0800 which is a value that is used for the TCP/IP protocol suite, the hexadecimal value 0x809B which is a value that is used for the AppleTalk protocol, the decimal number 2,054 which is a value that is used for ARP protocol, etc. In some examples, the protocol identifier 116 may include unregistered values. For example, the hexadecimal value for the TCP/IP protocol (0x0800), can be replaced to form a new registered value representing a new protocol identifier 116.

In the illustrated example of FIG. 1, the frame 110 is provided with the payload 118 to provide information to the destination node 108. For example, the payload 118 is the body of the frame 110 that includes the information produced by the source node 102 (e.g., the information included in the packet 104). The example payload 118 is an undefined length of n number of bits (e.g., the length n can range greater than 1500 octets). In some examples, if the packet 104 is a jumbo packet and network agnostic, synchronous networks have no maximum size, they instead rely on tokens to delimit packets. The example payload 118 can include a message, streaming data, malware, audio, images, etc. For example, if an email is to be sent by the source node 102 to the destination node 108, the payload 118 is the body (e.g., message, attachment, etc.) of the email while the remainder of the items required to send the email such as the "To:" line, the "Copy (Cc)" line, and the "Subject" line are the other parts of the frame inform the destination node 108 who the message is intended for and what the message is going to entail. In examples disclosed herein, the payload 118, the destination address 112, the source address 114, and the CRC are HW compressed by a hardware computational element in the source node 102 and/or the destination node 108.

FIG. 2 illustrates the example source node apparatus 102 to implement the example source node 102 of FIG. 1 to compress a new packet 201 and provide it to the example destination node 108. The example source node apparatus 102 of FIG. 2 includes the example new packet 201, an example data analyzer 202, an example learning machine 206, an example cache database 208, an example policy determiner 204, an example compression engine 210, an example compression analyzer 212, an example source modifier 214, and an example packet 104.

In the illustrated example of FIG. 2, the example source node apparatus 102 is provided with the data analyzer 202 to identify the protocol identifier 116 and the destination address 112 of the new packet 201. For example, the new packet 201 is included in the frame 110 in which includes the destination address 112. The example data analyzer 202 analyzes the values located in the destination address 112 and the protocol identifier 116 and then determines if the destination is new and/or unknown. For example, if the data analyzer 202 determines that the destination address 112 includes values that the data analyzer 202 does not recognize and/or has not processed before based on a query of the cache database 208, then the destination node 108 of the new packet 201 will be flagged as unknown. In other examples, if the data analyzer 202 determines that the destination address 112 includes values that it does recognize and/or has processed, the destination node 108 of the new packet 201 will not be flagged as unknown. The example data analyzer 202 may be implemented by a field-programmable gate array (FPGA) of a network interface controller located in the source node 102, a CPU, or any type of integrated circuit.

In the illustrated example of FIG. 2, the example source node apparatus 102 is provided with the policy determiner 204 to check the policy of the destination node 108. As used herein, a policy is a set of guidelines in which govern the way a node (e.g., a source node 102 and/or destination node 108) operates. For example, the policy determiner 204 is checking for a specific policy that determines if the destination node 108 supports or does not support HW compression functions. The policy of a node can be pre-determined by system administrator, a corporation, etc. The policy is dynamic in nature where the node can determine if the HW compression feature is turned on or off. In some examples, if the data analyzer 202 has determined that the destination node 108 of the new packet 201 is new and/or unknown, the capabilities of the destination node 108 are determined based on the policy identified by the policy determiner 204 by querying a database or memory such as a database or memory of the processor platform 800. If the example policy determiner 204 identifies that the policy for a HW compression is turned on, then the example destination address 112 is stored in the example cache database 208 with its policy. If the example policy determiner 204 identifies that the policy for HW compression is turned off for that destination node 108, then the example new packet 201 is provided to the destination node 108.

In the illustrated example of FIG. 2, the example source node apparatus 102 is provided with the learning machine 206 to determine potential compression functions that can be applied to the new packet 201 with the policy of the destination node 108 that has the HW compression feature set to on. In some examples, the learning machine 206 is incorporated to reason over the data in the cache database 208 and the information provided in the payload 118 and determine the efficient HW compression functions to utilize for the new packet 201. For example, the learning machine 206 is provided with the new packet 201 in which includes a payload 118 and retrieves data from the cache database 208 that is similar to the data located in the payload 118 and determines the HW compression functions that were efficient for payloads of similar type to the payload 118. In some examples, the payload 118 may include a payload type which can identify the type of data in the payload 118. The example learning machine 206 may identify the payload 118 type of the new packet 201 and retrieve data pertaining to the same payload type stored in the example cache database 208 in which includes the ratios and/or values that identify percent of efficiency of the HW compression functions applied to that payload type, and the example learning machine 206 will determine the highest ratios and/or percent efficiency values to apply to the example new packet 201. In some examples the learning machine 206 may be a statistical model, a convolutional neural network, a Bayesian model, etc., to over a period of time, remember which HW compression functions worked for what payload types, payload lengths, payload formats, etc.

The example source node apparatus 102 of FIG. 2 is provided with the cache database 208 to store an active list of known nodes (e.g., source node 102 and/or destination node 108) in which the HW compression feature is supported. For example, the cache database 208 may store data provided by the policy determiner 204 in which identifies a policy of the destination address 112 and a source address 114, and maps the destination address 112 and source address 114 with the policy for future use by the policy determiner 204. In some examples, the cache database 208 stores information provided by the source modifier 214 which includes values identifying HW compression functions, ratios, percentages, protocol identifiers, etc.

In the illustrated example of FIG. 2, the example source node apparatus 102 is provided with the compression engine 210 to HW compress the new packet 201. As used herein, compressing a packet is defined as reducing the storage size of a new packet 201 by reducing the number of bits needed to represent the new packet 201. In some examples, the compression engine 210 includes a plurality of configurable parallel compression engines, each engine configurable to a plurality of compression functions. The compression functions include a compression function identifier to inform a receiving node (e.g., the destination node 108) the type of HW compression function used on the new packet 201 in order to decompress and process it. For example, a HW compression function identifier is implemented to replace the currently available or unregistered values of the protocol ID 116 and create a new registered value for that protocol ID 116. Replacing the unregistered values includes replacing currently available values which have not yet been registered for other standard protocol identifiers. The HW compression function identifiers may not be a specified value, but instead increment the registered values of the protocol identifier 116 by an n-bit difference in order to indicate that the new packet 201 was compressed. For example, if compression function 1 was used on the new packet 201 that has a protocol identifier 116 of the hexadecimal value 0x0800, then the example compression engine 210 would provide the example compression analyzer with a HW compression function identifier of one (e.g., one corresponds to a one-bit difference implemented in the unregistered values of the protocol identifier 116). The example compression engine 210 may be implemented in a hardware computational element of the nodes (e.g., source node 102 and/or destination node 108) to achieve line-rate compression speeds. As used herein, line-rate compression speed is the rate at which the data is compressed relative to the rate at which data is transmitted across a network from one node to another (e.g., from the source node 102 to the destination node 108). It is pertinent to achieve line-rate compression speed to reduce the processing time of a packet at a node. The example compression engine 210 provides the output of each compression function used, to the example compression analyzer 212.

The example source node apparatus 102 of FIG. 2 is provided with the compression analyzer 212 to determine the HW compression function that provides the smallest reduced storage size of the example new packet 201 that is supported by the destination node 118. The compression analyzer 212 receives the output of the compression engine 210 which may be a ratio value, a percentage value, etc., describing the amount and/or length of data that was compressed. For example, the compression engine 210 may configure three compression engines to utilize compression function 1 304, compression function 2 306, and compression function 3 308 of FIG. 3, to compress the data of bit length 1,000 in the payload of the new packet 201. Compression function 1 304 may output a 50 to indicate that half (e.g., 50 percent) of the 1,000 bits of data have been compressed, compression function 2 306 may output an 80 to indicate that 800 bits (e.g., 80 percent) of the 1,000 bits of data have been compressed, and the compression function 3 308 may output a 20 to indicate that 200 bits (e.g., 20 percent) of the 1,000 bits of data have been compressed. For example, the output of the compression engine 210 may be metadata that includes character strings and/or bit values indicating the results of each compression function. The example compression analyzer 212 determines that compression function 2 306 compressed the data of the example new packet 201 to the smallest size and notify the example source modifier 214. The example compression analyzer 212 is to determine the smallest size of compressed data to increase network bandwidth by reducing the size of the network traffic (e.g., the amount of data transmitting across the network 106). The example compression analyzer 212 provides the smallest size compressed new packet 201 and the HW compression function ID to the example source modifier 214.

The example source node apparatus 102 of FIG. 2 is provided with the source modifier 214 to construct the new packet 201 with a modified protocol identifier 116, send the packet 104 to the destination node 108, and update the cache database 208. The example source modifier 214 constructs the new packet 201 with a modified protocol identifier 116 by applying the HW compression function identifier in the unregistered values of the protocol identifier 116 as described in connection with the example compression engine 210. When the example source modifier 214 has constructed the new packet 201 with a modified protocol identifier 116, the new packet 201 is considered a packet 104 and is ready to be provided to the example destination node 108. For example, the packet 104 may be a fully compressed packet, a partially compressed packet, or an uncompressed packet, depending on the output of the compression analyzer 212. The example source modifier 214 provides the packet 104 to the example destination node 108 and waits for a response from the example destination node 108. For example, when the destination node 108 receives the example packet 104, it determines if it can decompress and process the packet 104 based on the protocol identifier 116. If the destination node 108 determines it can decompress and process the packet 104, then it sends an acknowledgement (ACK) to the example source node 102, and if it determines the packet 104 cannot be decompressed and processed, then it sends a negative acknowledgement (NACK) to the example source node 102. This process is discussed further below in connection with FIG. 4. The example source modifier 214 of the source node 102 waits until the ACK or NACK is provided and updates the example cache database 208 with the example packet 104 corresponding to an ACK or NACK. For example, the packet 104 includes the destination address 112, the HW compression type utilized, and an ACK or NACK to inform a data requesting entity (e.g., the policy determiner 204, the learning machine 206, etc.) that the HW compression function did work or did not work for that specific destination address 112 and payload 118.

FIG. 3 illustrates the example compression engine 210 of FIG. 2 to compress a new packet 201 utilizing parallel compression functions on a hardware computational element. FIG. 3 includes an example compression function 1 304, an example compression function 2 306, an example compression function 3 308, and an example compression function m 310.

The example compression engine 210 of FIG. 3 can be implemented in a network interface controller (NIC) which is a hardware computational element of the source node 102 to connect the source node 102 to the network 106. For example, the NIC implements dedicated circuitry required to communicate using a specific physical layer and data link layer to standard such as Wi-Fi or Ethernet. As used herein, the physical layer is the first layer of the OSI model and translates logical communication requests from the data link layer into hardware specific operations to cause transmission or reception of electronic signals. In some examples, the NIC may include an FPGA to implement the source node apparatus 102 of FIG. 2.

The example compression engine 210 of FIG. 3 is provided with the example compression functions 304, 306, 308, and 310 in parallel to perform a plurality of compression functions on a new packet 201 based on the example policy determiner 204 and/or the example learning machine 206. For example, when the data analyzer 202 receives a new packet 201 and flags it as unknown, the policy determiner 204 checks the policy of the destination and determine what types, if any depending on the policy, of compression functions to utilize to compress the new packet 201. In some examples, the learning machine 206 determines the types of compression functions to utilize based on the information stored in the cache database 208. For example, the data analyzer 202 determines that the new packet 201 has the destination address 112 "A" and the payload 118 type "B" and the policy determiner 204 identifies that the destination address 112 "A" supports HW compression functions, the learning machine 206 will provide information to the compression engine 210 describing that compression function 1 304 and compression function 3 308 compress efficiently on payload 118 type "B." The example compression function 1 304 and compression function 3 308 may include lossless compression algorithm (e.g., an algorithm that allows original data to be exactly reconstructed from the compressed data) and the compression function 2 306 may also include a lossy compression algorithm (e.g., data compression that uses inexact approximations and partial data discarding to represent the original data such as removing redundant data) if the payload 118 is suited for lossy compression. In the example compression function m 310, m represents a number of compression functions implemented in the example compression engine 210. For example, there may be 100 compression functions, in which the $100^{th}$ compression function would be the same as compression function m 310.

FIG. 4 illustrates the example destination node apparatus 108 to implement the node environment 100 of FIG. 1 to decompress and process the packet 104 provided by the source node 102. The example apparatus of FIG. 4 includes the example packet 104, an example data analyzer 401, an example decompression engine 402, an example destination modifier 404, an example packet processor 406, and an example cache database 408.

The example destination node apparatus 108 of FIG. 4 is provided with the example data analyzer 401 to identify if the packet 104 has been HW compressed by checking the protocol ID 116. The example data analyzer 401 operates in a similar manner as described above in connection with data analyzer 202 of FIG. 2. In some examples, the data analyzer 401 can identify the HW compression function identifier, if included in the protocol ID 116, to determine if the packet 104 was compressed at the source node 102. For example, the data analyzer 401 may receive the packet 104 in which includes a one-bit difference in the protocol ID 116 and will determine that compression function 1 304 was utilized to HW compress the packet 104. If the example data analyzer 401 has identified the HW compression function utilized to compress the example packet 104, it may notify the example decompression engine 402.

In some examples, the data analyzer 401 cannot recognize the protocol ID 116 and will provide a NACK to the source node 102 or pass the packet 104 "up the stack". As used herein, the term 'passing up the stack" refers to the method used to process a packet in each layer of the OSI model, such as writing the packet to memory, validating the packet, sending the packet to memory buffer, etc. For example, the data analyzer 401 may not identify the combination of the HW compression function ID and the protocol ID 116 and therefore cannot decompress and/or process the packet 104, so the data analyzer 401 may send a NACK to the source node 102 to notify the source node 102 that the packet 104 cannot be processed. In other examples in which the data analyzer 401 does not recognize the protocol ID 116, it will try to provide the packet 104 to a software (SW) decompression engine not illustrated in the examples disclosed herein. The driver of the example destination node 108 will determine if this option is viable depending on the manufacturer of the example destination node 108.

The example destination node apparatus 108 of FIG. 4 is provided with the example decompression engine 402 to decompress the packet 104 based on the HW compression function ID. As used herein, data decompression is defined as restoring compressed data to its original form and/or restoring compressed data that is statistically comparable to its original form (e.g., in the example in which a packet 104 was compressed using a lossy compression algorithm). For example, the decompression engine 402 may be provided with a description of information identifying that HW compression function 1 304 was utilized to compress the packet 104 and the decompression engine 402 may utilize the inverse of the HW compression function 1 304 to decompress the packet 104 and retrieve the original data from the new packet 201. In some examples, the decompression engine 402 can revert the protocol ID 116. For example, the decompression engine 402 may decompress the packet 104 successfully (e.g., all original information in the packet was restored), and remove the one-bit difference (e.g., 0x0801) from the protocol ID 116 to achieve the original protocol ID 116 of hexadecimal value 0x0800. The decompressed new packet 201 is provided to the example destination modifier 404.

The example destination node apparatus 108 of FIG. 4 is provided with the example destination modifier 404 to provide a notification to the source modifier 214 and modify the example cache database 408. In some examples, the destination modifier 404 can send an ACK to the source modifier 214 to acknowledge that the packet 104 was decompressed successfully. For example, the decompression engine 402 may revert the protocol ID 116 of the example packet 104 which would be an indication that the packet 104 was successfully decompressed. In some examples, the destination modifier 404 can send a NACK to the source modifier 214 to alert the source modifier 214 that the packet was not successfully decompressed. For example, the decompression engine 402 may not recognize the protocol ID 116 of the packet 104 and pass it to the destination modifier 404 to alert that it cannot be decompressed or processed for this specific destination node 108.

The example destination node apparatus 108 of FIG. 4 is provided with the example cache database 408 to store an active list of successful and unsuccessful packet 104 decompressions. The example destination modifier 404 can update the example cache database 408 based on the output of the example decompression engine 402. For example, the destination modifier 404 may update the cache database 408 only if the decompression engine 402 successfully decompressed the packet 104. The example destination modifier 404 may update the example cache database 408 with information describing the decompression function utilized to decompress the packet 104, with the source address, and with the payload type. In modifying the example cache database 408, the example decompression engine 402 is able to periodically query the cache database 408 to determine the decompression method to use based on the HW compression function ID. In some examples, the cache database 408 operates in a similar manner as the cache database 208 described in connection with FIG. 2. In other examples, the cache database 408 can be asynchronous or synchronous with the cache database 208 of FIG. 2. For example, the cache database 408 may include information received from the example source modifier 214 such as the HW compression function IDs, the active list of known nodes that support HW compression of packets, etc. The example destination modifier 404 provides the decompressed new packet 201 to the example packet processor 406.

In the illustrated example of FIG. 4, the destination node 108 is provided with the example packet processor 406 to apply a variety of algorithms to the new packet 201 as it is passed to each layer of the OSI model to ultimately apply instructions included in the payload 118 to the destination node 108. The example packet processor 406 may include a single threaded architecture, a multi-threaded architecture, or a fast path architecture, each architecture defined by the system operator, the manufacturer, etc. Each of these architectures are example methods to implement a standard process to receive a packet and apply the payload of the packet to a destination depending on the type of payload and/or destination. In some examples, the packet processor 406 is implemented by the processor platform 800.

While an example manner of implementing the apparatus of FIG. 1 is illustrated in FIGS. 2, 3, and 4, one or more of the elements, processes and/or devices illustrated in FIGS. 2, 3, and 4 may be combined, divided, re-arranged, omitted, eliminated and/or implemented in any other way. Further, the example data analyzer 202, the example learning machine 204, the example cache database 206, the example policy determiner 208, the example compression engine 210, the example compression analyzer 212, the example source modifier 214, the example data analyzer 401, the example decompression engine 402, the example destination modifier 404, the example packet processor 406 and/or, more generally, the example node environment 100 of FIG. 1 may be implemented by hardware, software, firmware and/or any combination of hardware, software and/or firmware. Thus, for example, any of the example data analyzer 202, the example learning machine 204, the example cache database 206, the example policy determiner 208, the example compression engine 210, the example compression analyzer 212, the example source modifier 214, the example data analyzer 401, the example decompression engine 402, the example destination modifier 404, the example packet processor 406 and/or, more generally, the example node environment 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data analyzer 202, the example learning machine 204, the example cache database 206, the example policy determiner 208, the example compression engine 210, the example compression analyzer 212, the example source modifier 214, the example data analyzer 401, the example decompression engine 402, the example destination modifier 404, and the example packet processor 406 is/are hereby expressly defined to include a non-transitory computer readable storage device or storage disk such as a memory, a digital versatile disk (DVD), a compact disk (CD), a Blu-ray disk, etc. including the software and/or firmware. Further still, the example node environment 100 of FIG. 1 may include one or more elements, processes and/or devices in addition to, or instead of, those illustrated in FIGS. 2, 3, and 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
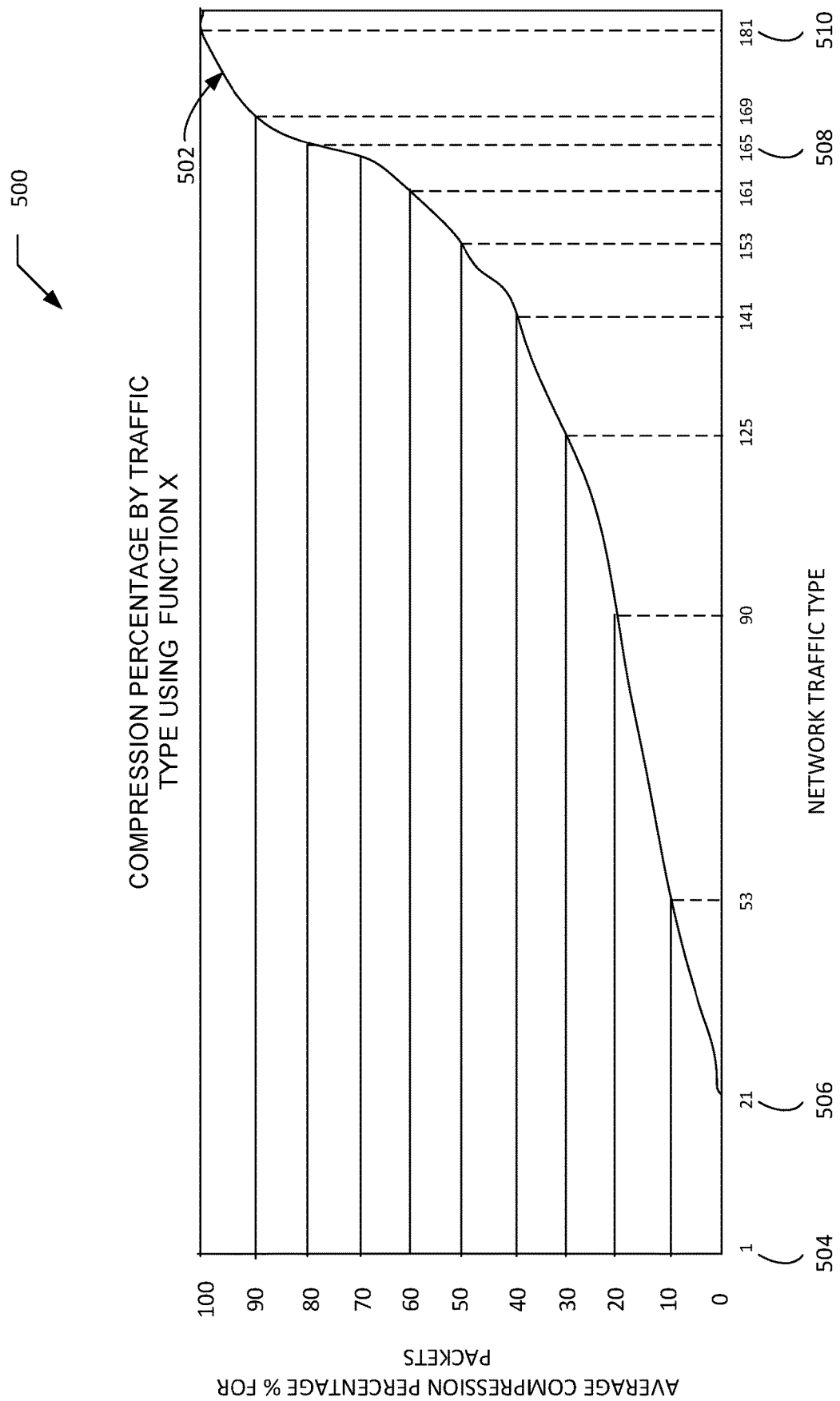
FIG. 5 is an example diagram to illustrate the average compression percentage of a compression function of the apparatus of FIG. 3.

FIG. 5 is an example graph 500 depicting the average compression percentage by traffic type using function x of the apparatus of FIG. 3. The example graph 500 illustrates one HW compression function across a plurality of network traffic types. As used herein, a network traffic type is the type of data that is flowing through the network 106. For example, network traffic types include bursty traffic (e.g., HTTP, graphics, downloads, video content), interactive traffic (e.g., sessions that consists of comparatively short response/request pairs such as web-browsing, online purchasing, etc.), latency sensitive traffic (e.g., traffic the operator is expected to deliver on time such as video conference and online gaming), and non-real time traffic (e.g., applications where timely delivery is not pertinent such as email and batch processing applications). The example graph 500 of FIG. 5 is provided with a curve 502, a first network traffic type 504, a second network traffic type 506, a third network traffic type 508, and a fourth network traffic type 510.

In the example graph 500, the horizontal axis depicts network traffic types 504, 506, 508, and 510 as numeric values to display their positions under the curve 502 relative to their average compression percentage. Each numeric value corresponds to a unique network traffic type, which is correlated to a plurality of packets. For example, network traffic includes at least one or more packets 104 flowing through a network 106, and the network traffic types 504, 506, 508, and 510 of the example graph 500 may include more than one new packet 201. In some examples, the first network traffic type 504 is a file transfer protocol (FTP) used for the transfer of computer files, the second network traffic type 506 is a secure sockets layer (SSL) transaction to secure communication between a web browser and a web server, the third network traffic type 508 is voice over internet protocol (VoIP) to deliver voice communications and multimedia sessions over the internet, and the fourth network traffic type 510 is network news transfer protocol (NNTP) to transport news articles between news servers. Additionally, the first network traffic type 504, the second network traffic type 506, the third network traffic type 508, and the fourth network traffic type 510 could be any other type of network traffic, could be in a different order, etc.

In the example graph 500, the vertical axis depicts average compression percentages of the new packets 201 of different traffic types across the network 106. For example, each new packet 201 in the network traffic type is compressed using one HW compression function x, and the amount of data that is compressed in the new packet 201 is averaged to an increment of 10 (e.g., 10 percent compressed, 20 percent compressed, 30 percent compressed, etc.). As used herein, x represents the HW compression function used to compress the new packets 201 of each traffic type. In the example graph 500, the curve 502 displays a compression percentage point at which the network traffic types 504, 506, 508, and 510 achieved compression. For example, the first network traffic type 504 and the second network traffic type 506 were zero percent compressed, as they do not associate with a point on the curve 502. In this manner, the third network traffic type 508 is 80 percent compressed, as it is associated with the point on the curve 502 with the 80 mark on the horizontal axis, and the fourth network traffic type 510 is 100 percent compressed, as it is associated with the point on the curve 502 with the 100 mark on the horizontal axis. The 80 percent compression of the third network traffic type 508 means that 80 percent of the packets 104 were fully compressed (e.g., data storage size was fully reduced) in that traffic type. Additionally, other network traffic types may be 10 percent compressed, 20 percent compressed, 30 percent compressed, etc.

In some examples, the compression analyzer 212 generates the example graph 500 and similar graphs to determine the HW compression functions to use for unique network traffic type packets (e.g., such as new packet 201). For example, the compression analyzer 212 stores a data table of network traffic types with their corresponding compression percentage for a unique HW compression function. The example compression analyzer 212 may store data table in the cache database 208 for future retrieval by the example learning machine 206, the example compression engine 210, the example source modifier 214, and/or the example policy determiner 204.

In some examples, the learning machine 206 of FIG. 2 determines, based on the data table generated and stored by the compression analyzer 212, the HW compression functions to utilize for a new packet 201 of a unique network traffic type. For example, the learning machine 206 identifies that the packets of the first and second network traffic type 504, 506 were not compressed and provide a notification to the example compression engine 210 to not use that HW compression function on packets similar to the packets of the first and second network traffic type 504, 506. In some examples, the learning machine 206 identifies that 80 percent or more of the packets of the third and fourth network traffic type 508, 510 were fully compressed and provide a notification to the example compression engine 210 to utilize that HW compression function on packets similar to the packets of the third and fourth network traffic type 508, 510.

Figure 6:
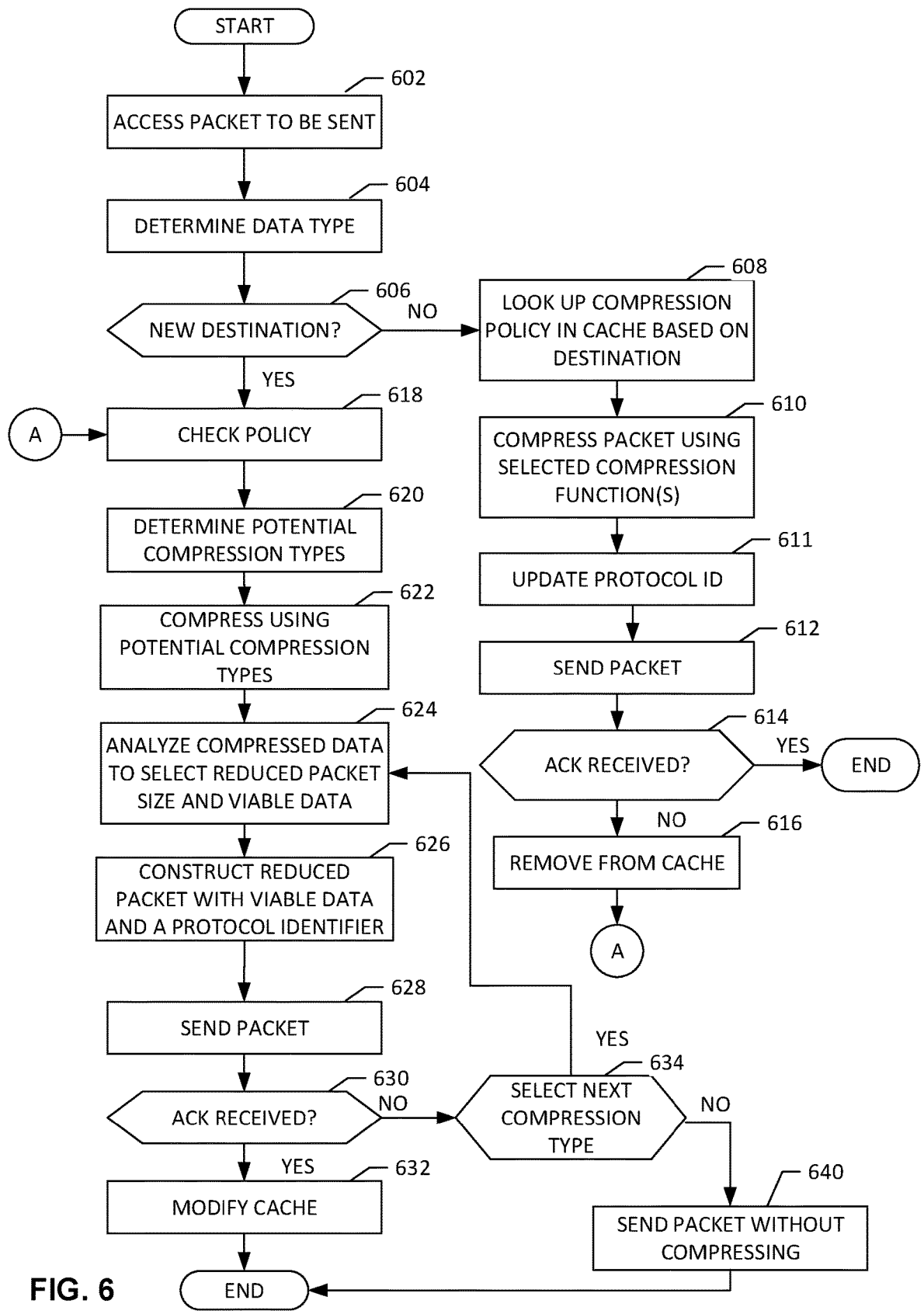
FIG. 6 is a flowchart representative of machine readable instructions which may be executed to implement the apparatus of FIG. 2.
Figure 7:
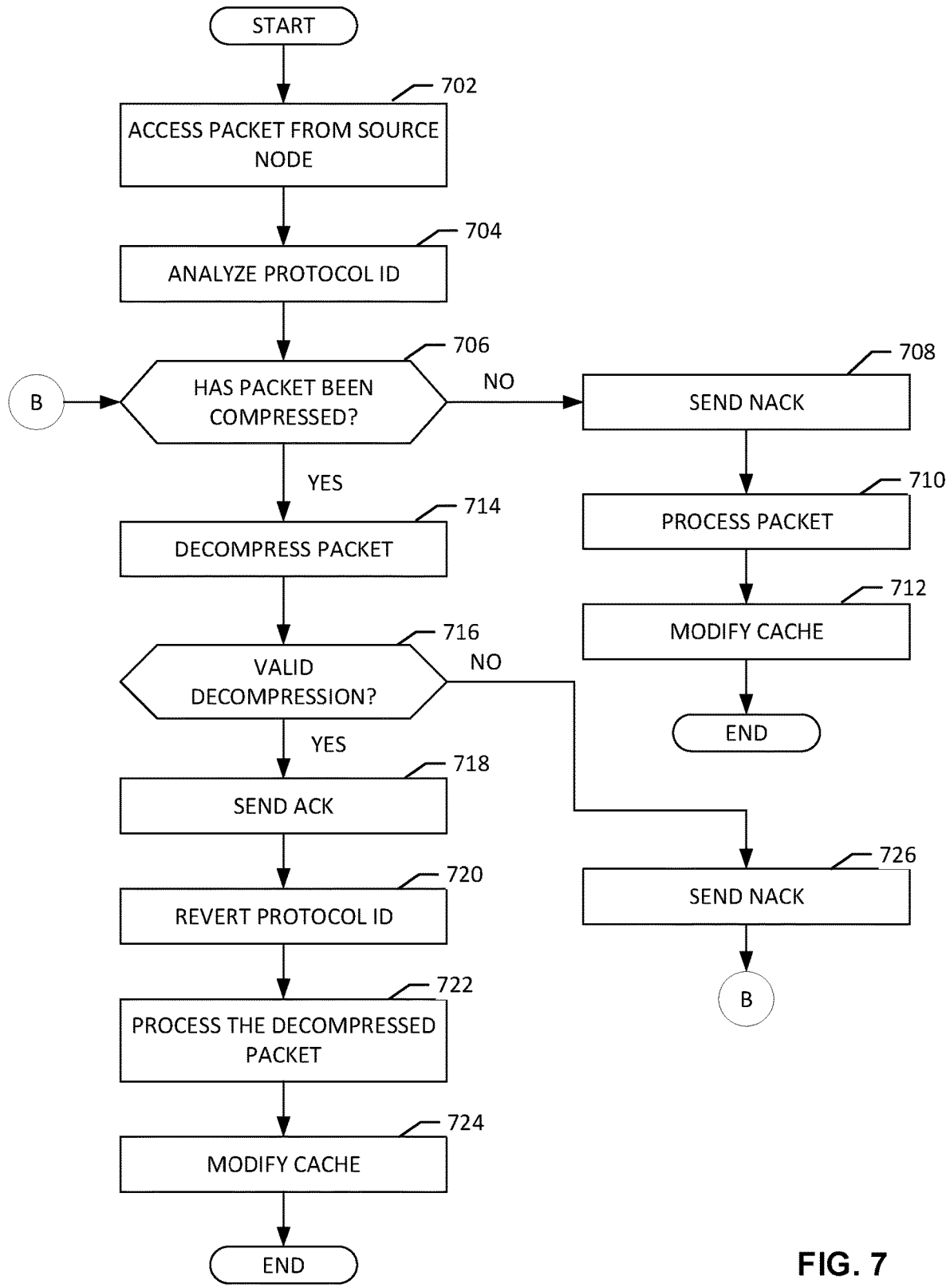
FIG. 7 is a flowchart representative of machine readable instructions which may be executed to implement the apparatus of FIG. 4.

A flowchart representative of example hardware logic, machine readable instructions, hardware implemented state machines, and/or any combination thereof for implementing the apparatus of FIGS. 2, 3, and 4 are shown in FIGS. 6 and 7. The machine readable instructions may be one or more executable program or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 6 and 7, many other methods of implementing the example apparatus of FIGS. 2, 3, and 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The program to compress a packet of FIG. 6 begins at block 602 when the example source node 102 accesses a packet to be sent. For example, the source node 102 may receive a new packet 201 including a preamble, destination address 112, a source address 114, a protocol ID 116, a payload 118, and a CRC. The example source node 102 may receive the new packet 201 at a NIC and provide it to the example data analyzer 202 (FIG. 2). The source node 102 may also generate the new packet 201 using the hardware computational elements in a NIC. The example data analyzer 202 is provided with the example new packet 201 and determines a data type 604. For example, the data analyzer 202 identifies the network traffic type by analyzing the data in the payload 118. The example data analyzer 202 identifies the destination address 112 of the example new packet 201 and determines if it is a new destination (block 606). For example, the data analyzer 202 may query the cache database 208 or a local memory to determine if the destination address 112 included in the new packet 201 is known or unknown.

If the example data analyzer 202 determines the destination address 112 is not new, it notifies the example policy determiner 204 (FIG. 2) to look up the compression policy in the cache database 208 based on the destination (block 608). For example, the policy determiner 204 may provide the destination address to the cache database 208 and query the cache database 208 to identify if the destination supports the HW compression feature. At block 608, the example policy determiner 204 may determine that the destination node 108 does not support HW compression and send the new packet 201 without compression. At block 608, the example policy determiner 204 looks up the compression policy in the cache database 208 based on the destination address 112 and notifies the example learning machine 206 and/or the example compression engine 210 that the destination node 108 supports the hardware compression feature.

The example compression engine 210 compresses the new packet 201 using the selected compression functions (block 610). For example, the policy determiner 204 may provide the learning machine 206 with the new packet 201 and the learning machine 206 may identify the data protocol ID 116, the payload 118, and the destination address 112 to make a decision, based on a learning model, what HW compression functions were most efficient with the identified protocol ID 116, payload, 118, and destination address 112. The example learning machine 206 may retrieve the example graph 500 (FIG. 5) stored by the example compression analyzer 212 to determine the efficient HW compression functions to utilize.

The example compression engine 210 receives the instruction from the example learning machine 206 and compresses the new packet 201 using the selected compression functions (block 610). For example, the compression engine 210 may have received instructions to run multiple HW compression functions and therefore configures a first compression engine to execute HW compression function one 304, a second compression engine to execute HW compression function two 306, a third compression engine to execute HW compression function three 308, etc.

At block 611, the example source modifier 214 updates the protocol ID 116. For example, the source modifier 214 constructs the new packet 201 with a modified protocol identifier 116 by applying the HW compression function identifier in the unregistered values of the protocol ID 116 as described in connection with the example compression engine 210 of FIG. 2. In some examples, the source modifier 214 regenerates the CRC for the compressed packet 104, as it is the checksum for the new protocol identifier 116 and compressed payload 118. The example source modifier 214 sends the packet 104 (block 612). For example, the compression analyzer 212 may receive the output ratios/percentage value of the compression engine 210 and determine compression function one 304 fully compressed the new packet 201 and may provide it to the source modifier 214 to modify the protocol ID 116 based on the HW compression function and send it to the destination node as a packet 104.

The example source modifier 214 waits to receive an ACK from the example destination node 108 (block 614). If the example source modifier 214 receives an ACK, the packet 104 was decompressed and processed successfully and the process ends. If the example source modifier 214 does not receive an ACK (block 614), then it removes the destination from the cache database 208 and the source node 102 starts the process for the new packet 201 at block 618. For example, the source modifier 214 may receive a NACK from the destination node 108 that indicates the destination node did not recognize the protocol ID 116 and could not decompress the packet 104.

Returning to block 606, if the data analyzer 202 determines that the new packet 201 includes a new destination address 112, the policy determiner 204 will check the policy (block 618) of the destination node 108 corresponding to the new destination address 112. For example, the policy determiner 204 may poll the destination node 108 for the policies on HW compression features. If the example policy determiner 204 determines that the policy of the example destination node 108 supports HW compression, then the learning machine 206 will determine potential compression functions (block 620). For example, the learning machine 206 may utilize a learning model to determine the HW compression functions that compressed the packets with similar payloads to the new packet 201 and provide those HW compression functions to the compression engine 210.

The example compression engine 210 compresses the new packet 201 using the potential compression functions (block 622) determined by the example learning machine. For example, the compression engine 210 may configure multiple compression engines in parallel to utilize multiple compression functions synchronously on the new packet 201. The example compression analyzer 212 analyzes the compressed data to select the reduced packet 104 size and viable data (block 624). For example, the compression analyzer 212 may receive a plurality of the same new packets 201 compressed in different ways and determine which compressed packet is the smallest, because the smallest packet size is pertinent to increased network bandwidth. The example compression analyzer 212 may also determine if the data in the reduced packet 104 is viable. For example, the data in the packet 104 may have been compressed by a significant amount by removing data, some of the removed data is redundant but some might have been pertinent to the instructions, information, etc. the source node 102 is sending to the destination node 108 and therefore is no longer viable to the destination node 108.

The example source modifier 214 constructs the reduced packet with viable data and a new protocol ID 116 (block 626). For example, the source modifier 214 may receive the compressed new packet 201 from the compression analyzer 212 along with the type of HW compression function utilized to compress it. The example source modifier 214 increments unregistered values of the protocol ID 116 by an n-bit difference based on the HW compression function ID. For example, if HW compression ID is 1, then the source modifier 214 increments the unregistered values of the protocol ID 116 by a one-bit difference. In some examples, the source modifier 214 regenerates the CRC for the compressed packet 104, as it is the checksum (e.g., a value representing the sum of correct values in a payload) for the new protocol identifier 116 and compressed payload 118.

The example source modifier 214 sends the packet 104 (block 628). The example source modifier 214 waits to receive an ACK from the example destination node 108 (block 630). For example, when the source modifier 214 sends the packet 104, the example destination node 108 will send either an acknowledgement that the packet 104 was successfully decompressed and processed or a negative acknowledgment that it was not recognizable by the destination node 108. If the example source modifier 214 receives an ACK, it will modify the cache database 208 (block 632). For example, the source modifier 214 may store the packet 104 with the compression function utilized to compress it along with a flag that identifies that this destination and packet payload worked together in the cache database 208 for future use by the policy determiner 204, the learning machine 206, and the compression engine 210.

If the source modifier 214 receives a NACK from the destination node 108, then it will decide if it should select the next compression type (block 634). For example, the source modifier 214 can determine if the destination node 108 is to always receive a compressed packet or if it is to receive a standard packet. For example, if the source modifier 214 determines that the destination node 108 does not support the HW compression feature, then it will send the new packet 201 without utilizing the compression functions (block 640) (e.g., a standard packet is sent to be processed up the stack at the destination node 108). In some examples, if the source modifier 214 determines the destination node 108 is to be provided with a compressed packet, the process returns to block 624. For example, the source modifier 214 may provide the packet to the compression engine 210 to be recompressed using different HW compression functions that the destination node 108 may recognize. The program of FIG. 6 ends once the source modifier 214 has modified the cache database 208

In some examples, at block 606 of FIG. 6, support for HW compression of a new destination can be determined by sending an empty packet (e.g., with only the destination address 112, a source address 114, and a minimum payload 118). For example, to stay compliant with protocol standards (e.g., the protocol standards do not allow the transmitting of an empty payload), the minimum payload 118 may include a list of supported compression functions (e.g., compression function 1 304, compression function 2 306, etc.) with a protocol ID 116 of the hexadecimal value 0x0000. For example, at block 618, the example policy determiner 204 does not look up the policy in the cache database 208 or poll the destination node 108 for its' policy, but instead the policy determiner 204 sends the empty packet to the destination node 108 and waits to receive a response such as an ACK or NACK. If the destination node 108 supports the HW compression feature, it may respond with an ACK and the policy determiner 204 may increment the available unregistered values of the protocol ID 116 with a one-bit difference and store it in the cache database 208. For example, the policy determiner 204 may increment the protocol ID 116 with the hexadecimal value 0x0000 to 0x0C01 and store that in the cache database 208. For future use, the policy determiner 204 may retrieve the policy of the same destination and identify that it supports HW compression because of the one-bit increment.

Turning to the decompression program of FIG. 7, at block 702, the destination node 108 accesses the packet 104 from the source node 102. For example, a NIC in the destination node 108 may receive the packet 104 and provide it to the data analyzer 401 (FIG. 4). The example data analyzer 401 analyzes the protocol ID 116 (block 704). For example, the data analyzer 401 may receive the packet 104 which includes a modified protocol ID 116 based on the HW compression function used to compress the new packet 201. The example data analyzer 401 determines if the packet 104 has been compressed (block 706). For example, the data analyzer 202 identifies if the protocol ID 116 is a value that includes a HW compression ID. If the example data analyzer 401 determines that the packet has not been compressed, it may send a NACK to the example source node 102 (block 708). For example, the data analyzer 401 may not recognize the protocol ID 116 and/or may not support HW compression and inform the source node 102 so that the source node 102 can proceed with a different procedure to send the packet.

In some examples, after block 708, the data analyzer 401 can process the packet 104 (block 710). For example, the data analyzer 202 provides the packet 104 to the packet processor 406 (FIG. 4) in which can further decide how to apply the data in the packet 104 to the destination node 108. The example packet processor 406 modifies the cache database 408 (block 712) based on how it processed the packet 104 and how successfully it was applied to the destination node 108.

At block 706, if the data analyzer 401 recognizes the protocol ID 116 of the packet 104, then it will provide the packet 104 to the example decompression engine 402 to decompress the packet 104 (block 714). For example, the decompression engine 402 can be provided with an extracted HW compression function ID from the data analyzer 401 and is configured to decompress the packet 104 based on the HW compression function. The decompression engine 402 determines if the decompression was valid (block 716). For example, after decompression of the packet 104, the decompression engine 402 checks the cyclic redundancy check (CRC) which detects errors that occur during retrieval of the packet. The decompression engine 402 may not decompress the packet successfully due too much data being lost, unrecognizable compression technique used, etc. If the decompression engine 402 determines the packet 104 is not validly decompressed, it will notify the example destination modifier 404 to send a NACK (block 726) to inform the example source modifier 214 (FIG. 2) to select the next compression type or send the new packet 201 as uncompressed. If the packet 104 is successfully decompressed, the example destination modifier 404 will send an ACK (block 718). For example, the destination modifier 404 may be notified by the decompression engine 402 that decompression was completed and inform the source modifier 214.

The example destination modifier 404 reverts the protocol ID (block 720) after the ACK is sent. For example, the destination modifier 404 may decrement the protocol ID 116 based on the decompression function used to decompress the packet 104 in order to properly process the decompressed new packet 201. At block 722, the example packet processor 406 is provided with the decompressed new packet 201 and processes the decompressed new packet 201. For example, the packet processor 406 may pass the new packet 201 up the stack until the data in the payload 118 is applied to the destination node 108.

The example destination modifier 404 modifies the cache database 408 (block 724) to keep the cache database 408 updated periodically. For example, the packet processor 406 may notify the destination modifier 404 that the new packet 201 has been applied to the destination node 108. The process of FIG. 7 ends.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 8:
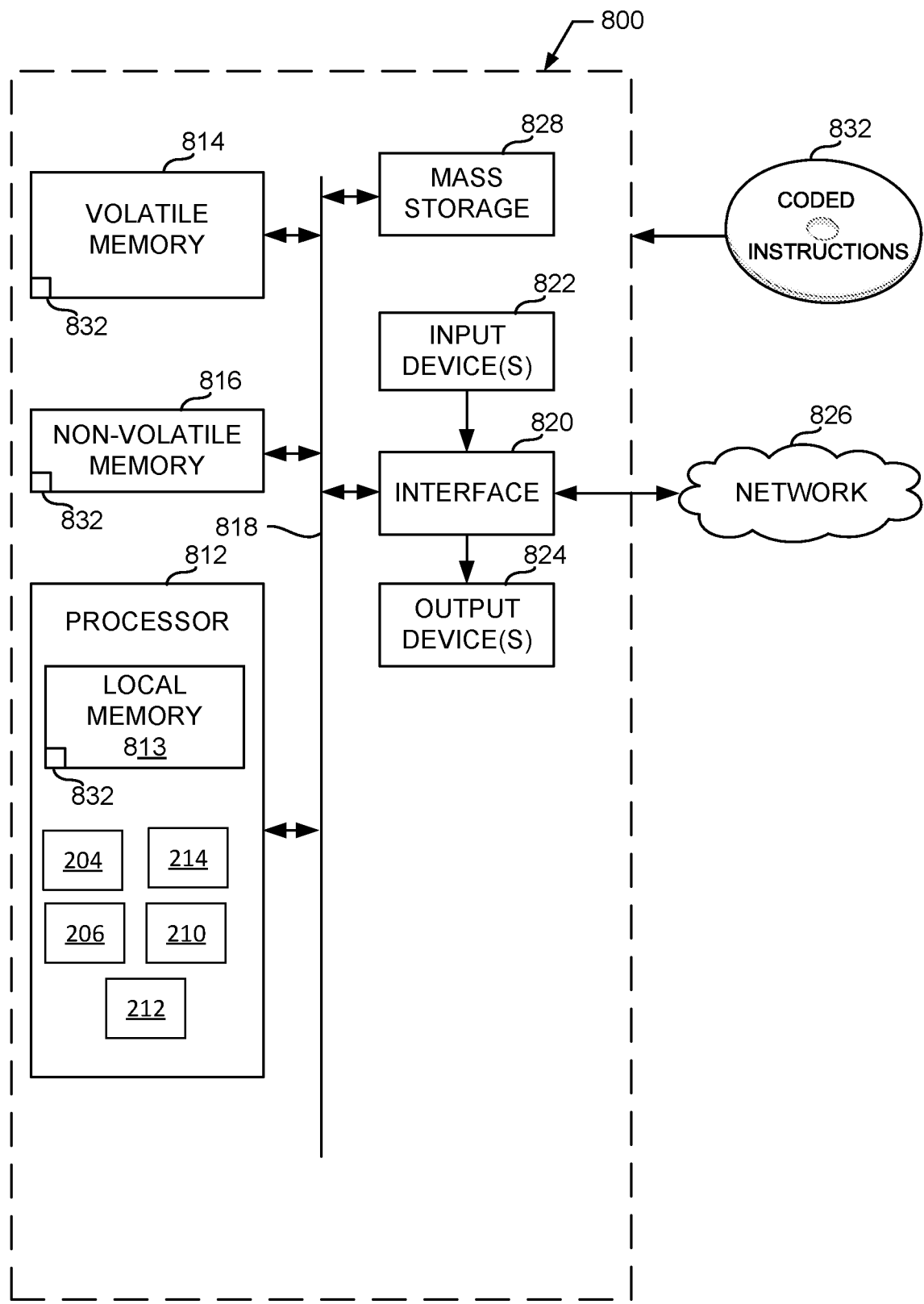
FIGS. 8 and 9 are block diagrams of an example processing platform structured to execute the instructions of FIGS. 6 and 7 to implement FIGS. 2 and 4.

FIG. 8 is a block diagram of an example processor platform 800 structured to execute the instructions of FIG. 6 to implement the apparatus of FIGS. 2 and 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data analyzer 202, the example policy determiner 204, the example learning machine 206, the example compression engine 210, the example compression analyzer 212, and the example source modifier 214.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 600 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 6 may be stored in the mass storage device 828, in the volatile memory 814, in the non-volatile memory 816, and/or on a removable non-transitory computer readable storage medium such as a CD or DVD.

Figure 9:
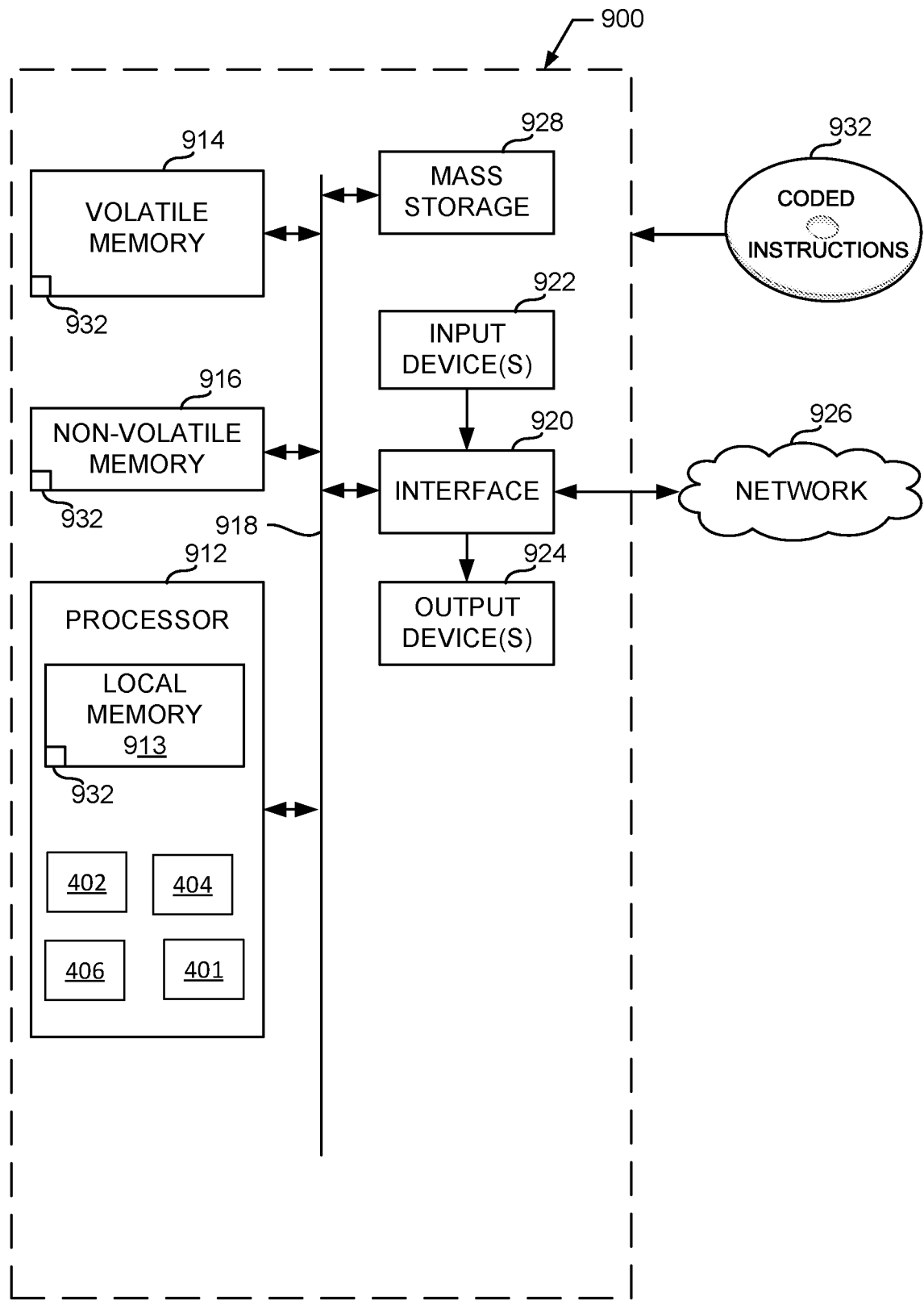

FIG. 9 is a block diagram of an example processor platform 900 structured to execute the instructions of FIG. 7 to implement the apparatus of FIG. 4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data analyzer 401, the example decompression engine 402, the example destination modifier 404, and the example packet processor 406.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 600 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that reduce time on wire for packet transmissions. The disclosed methods, apparatus and articles of manufacture improve the efficiency of using a computing device by increasing network bandwidth by reducing the size of packet payloads that are used to provide information from one computing device to another. The disclosed methods, apparatus and articles of manufacture are accordingly directed to one or more improvement(s) in the functioning of a computer.

Example 1 includes an apparatus to compress packets, the apparatus comprising, a data analyzer to identify a new destination address and a protocol identifier of an input packet, the new destination address corresponding to a new destination node and the protocol identifier corresponding to a communication system between the new destination node and a source node, a compression engine to utilize a plurality of compression functions based on the new destination address and the protocol identifier, the compression engine to reduce a size of the input packet, a compression analyzer to identify a reduced packet and a compression function identifier corresponding to the reduced packet, the compression function identifier associated with one of the compression functions, and a source modifier to construct a packet to include the compression function identifier by modifying unregistered values of a protocol identifier by a difference associated with the compression function identifier, the packet to inform the new destination node of a compression function utilized to compress the input packet.

Example 2 includes the apparatus as defined in example 1, further including a policy determiner to determine a policy of the new destination node, the policy associated with a set of guidelines corresponding to the new destination node, the guidelines to determine if the new destination node supports compression of the input packet.

Example 3 includes the apparatus as defined in example 1, wherein the compression engine utilizes hardware compression functions to reduce the size of the input packet.

Example 4 includes the apparatus as defined in example 1, wherein the compression engine includes a plurality of configurable parallel compression engines to apply ones of the compression functions to the input packet.

Example 5 includes the apparatus as defined in example 1, wherein the source modifier increments the unregistered values of the protocol identifier by an n-bit difference.

Example 6 includes the apparatus as defined in example 1, further including a cache database to store an active list of known nodes supporting a compression feature.

Example 7 includes the apparatus as defined in example 5, wherein the compression feature includes hardware compression of a packet in a node and supporting the compression feature enables hardware compression of a packet in a node.

Example 8 includes the apparatus as defined in example 1, further including a learning machine to determine potential compression functions to apply to the input packet.

Example 9 includes the apparatus as defined in example 7, wherein the learning machine utilizes a statistical model to identify compression functions to apply to the packet over a period of time based on the new destination address and protocol identifier of the packet.

Example 10 includes a non-transitory computer readable storage medium comprising instructions that, when executed, cause a processor to at least identify a new destination address and a protocol identifier of an input packet, the new destination address corresponding to a new destination node and the protocol identifier corresponding to a communication system between the new destination node and a source node, utilize a plurality of compression functions based on the new destination address and the protocol identifier, the compression functions to reduce a size of the input packet, identify a reduced packet and a compression function identifier corresponding to the reduced packet, the compression function identifier associated with one of the compression functions, and construct a packet to include the compression function identifier by modifying unregistered values of a protocol identifier by a difference associated with the compression function identifier, the packet to inform the new destination node of a compression function utilized to compress the input packet.

Example 11 includes the non-transitory computer readable storage medium as defined in example 10, wherein the instructions, when executed, cause the processor to determine a policy of the new destination node, the policy associated with a set of guidelines corresponding to the new destination node, the guidelines to determine if the new destination node supports compression of the input packet.

Example 12 includes the non-transitory computer readable storage medium as defined in example 10, wherein the instructions, when executed, cause the processor to utilize hardware compression functions to reduce the size of the input packet.

Example 13 includes the non-transitory computer readable storage medium as defined in example 10, wherein the instructions, when executed, cause the processor to include a plurality of configurable parallel compression engines to apply ones of the compression functions to the input packet.

Example 14 includes the non-transitory computer readable storage medium as defined in example 10, wherein the instructions, when executed, cause the processor to increment the unregistered values of the protocol identifier by an n-bit difference.

Example 15 includes the non-transitory computer readable storage medium as defined in example 10, wherein the instructions, when executed, cause the processor to store an active list of known nodes supporting a compression feature.

Example 16 includes the non-transitory computer readable storage medium as defined in example 15, wherein the instructions, when executed, cause the processor to hardware compress a packet in a node that supports a compression feature, the compression feature to enable hardware compression of a packet in a node.

Example 17 includes the non-transitory computer readable storage medium as defined in example 10, wherein the instructions, when executed, cause the processor to determine potential compression functions to apply to the input packet.

Example 18 includes the non-transitory computer readable storage medium as defined in example 10, wherein the instructions, when executed, cause the processor to utilize a statistical model to identify compression functions to apply to the input packet over a period of time based on the new destination address and protocol identifier of the packet.

Example 19 includes a method comprising identifying, by executing an instruction with a processor, a new destination address and a protocol identifier of an input packet, the new destination address corresponding to a new destination node and the protocol identifier corresponding to a communication system between the new destination node and a source node, utilizing, by executing an instruction with the processor, a plurality of compression functions based on the new destination address and the protocol identifier, the compression functions to reduce a size of the input packet, identifying, by executing an instruction with a processor, a reduced packet and a compression function identifier corresponding to the reduced packet, the compression function identifier associated with one of the compression functions, and constructing, by executing an instruction with the processor, a packet to include the compression function identifier by modifying unregistered values of a protocol identifier by a difference associated with the compression function identifier, the packet to inform the new destination node of a compression function utilized to compress the input packet.

Example 20 includes the method as defined in example 19, further including determining a policy of the new destination node, the policy associated with a set of guidelines corresponding to the new destination node, the guidelines to determine if the new destination node supports compression of the input packet.

Example 21 includes the method as defined in example 19, further including utilizing hardware compression functions to reduce the size of the input packet.

Example 22 includes the method as defined in example 19, further including a plurality of configurable parallel compression engines to apply ones of the compression functions to the input packet.

Example 23 includes the method as defined in example 19, further including incrementing the unregistered values of the protocol identifier by an n-bit difference.

Example 24 includes the method as defined in example 19, further including storing an active list of known nodes supporting a compression feature.

Example 25 includes the method as defined in example 24, further including hardware compressing a packet in a node that supports a compression feature, the compression feature to enable hardware compression of a packet in a node.

Example 26 includes the method as defined in example 24, further including determining potential compression functions to apply to the input packet.

Example 27 includes a non-transitory computer readable storage medium comprising instructions that, when executed, cause a machine to at least one of distribute, configure, assemble, install, instantiate, retrieve, decompress, and decrypt second instructions for execution, the second instructions to, when executed, cause a machine to identify a new destination address and a protocol identifier of an input packet, the new destination address corresponding to a new destination node and the protocol identifier corresponding to a communication system between the new destination node and a source node, utilize a plurality of compression functions based on the new destination address and the protocol identifier, the compression functions to reduce a size of the input packet, identify a reduced packet and a compression function identifier corresponding to the reduced packet, the compression function identifier associated with one of the compression functions, and construct a packet to include the compression function identifier by modifying unregistered values of a protocol identifier by a difference associated with the compression function identifier, the packet to inform the new destination node of a compression function utilized to compress the input packet.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one memory;
   instructions in the apparatus; and
   processor circuitry to execute the instructions to:
   determine a compression policy of a destination node, the compression policy corresponding to whether the destination node supports a compression of an input packet;
   identify two or more different compression functions to apply to the input packet based on a comparison of a first payload type of the input packet to known payload types associated with compression functions, the comparison to determine which known payload types are similar to the first payload type;
   select a first compression function of the two or more compression functions to compress the input packet based on the compression policy and a first amount of reduction of the input packet, the first amount of reduction by the first compression function being greater than a second amount of reduction of the input packet compressed utilizing a second compression function; and modify a protocol identifier of the input packet to inform the destination node of the first compression function utilized to compress the input packet.

2. The apparatus of claim 1, wherein the processor circuitry is to query the destination node to determine the compression policy of the destination node.

3. The apparatus of claim 1, wherein the processor circuitry is to store a list of destination nodes supporting a compression feature.

4. The apparatus of claim 3, wherein the compression feature includes hardware compression of a packet in a node and supporting the compression feature enables hardware compression of a packet in a node.

5. The apparatus of claim 1, wherein the processor circuitry is to apply a plurality of compression functions to the input packet, at least one of the plurality of compression functions corresponding to the first compression function that supports the compression policy and reduces a size of the input packet.

6. The apparatus of claim 1, wherein the compression policy is associated with a set of guidelines corresponding to whether the destination node supports a hardware compression of the input packet.

7. The apparatus of claim 1, wherein the processor circuitry is to utilize hardware compression functions to reduce a size of the input packet, the first compression function indicative of a hardware compression function.

8. The apparatus of claim 1, wherein the processor circuitry is to increment unregistered values of the protocol identifier by n, wherein n is a value of one or greater than one and is indicative of a compression function identifier associated with the first compression function utilized to compress the input packet.

9. The apparatus of claim 1, wherein the processor circuitry is to increment the protocol identifier by an n-bit difference, where n corresponds to an amount of data in the input packet that was compressed by the first compression function.

10. At least one non-transitory computer readable storage medium comprising instructions that, when executed, cause one or more processors to at least:

determine a compression policy of a destination node, the compression policy corresponding to whether the destination node supports a compression of an input packet;

identify two or more different compression functions to apply to the input packet based on a comparison of a first payload type of the input packet to known payload types associated compression functions, the comparison to determine which known payload types are similar to the first payload type;

select a first compression function of the two or more compression functions to compress the input packet based on the compression policy and a first reduction of the input packet, the first reduction by the first compression function being greater than a second reduction of the input packet compressed utilizing a second compression function; and modify a protocol identifier of the input packet, the modified protocol identifier to inform the destination node of the first compression function utilized to compress the input packet.

11. The at least one non-transitory computer readable storage medium of claim 10, wherein the instructions cause the one or more processors to query the destination node to determine the compression policy of the destination node.

12. The at least one non-transitory computer readable storage medium of claim 11, wherein the instructions cause the one or more processors to store a list of destination nodes supporting a compression feature.

13. The at least one non-transitory computer readable storage medium of claim 12, wherein the compression feature includes hardware compression of a packet in a node and supporting the compression feature enables hardware compression of a packet in a node.

14. The at least one non-transitory computer readable storage medium of claim 10, wherein the instructions cause the one or more processors to apply a plurality of compression functions to the input packet, at least one of the plurality of compression functions corresponding to the first compression function that supports the compression policy and reduces a size of the input packet.

15. The at least one non-transitory computer readable storage medium of claim 10, wherein the compression policy is associated with a set of guidelines corresponding to whether the destination node supports a hardware compression of the input packet.

16. The at least one non-transitory computer readable storage medium of claim 10, wherein the instructions cause the one or more processors to utilize hardware compression functions to reduce a size of the input packet, the first compression function indicative of a hardware compression function.

17. The at least one non-transitory computer readable storage medium of claim 10, wherein the instructions cause the one or more processors to increment unregistered values of the protocol identifier by n, wherein n is a value of one or greater than one and is indicative of a compression function identifier associated with the first compression function utilized to compress the input packet.

18. The at least one non-transitory computer readable storage medium of claim 10, wherein the instructions cause the one or more processors to increment the protocol identifier by an n-bit difference, where n corresponds to an amount of data in the input packet that was compressed by the first compression function.

19. An apparatus comprising:

means for determining a compression policy of a destination node, the compression policy corresponding to whether the destination node supports a compression of an input packet;

means for identifying two or more different compression functions to apply to the input packet based on a comparison of a first payload type of the input packet to known payload types associated with compression functions, the comparison to determine which known payload types are similar to the first payload type;

means for selecting a first compression function of the two or more compression functions to compress the input packet based on the compression policy and a first amount of reduction of the input packet, the first amount of reduction by the first compression function being greater than a second amount of reduction of the input packet compressed utilizing a second compression function; and means for modifying a protocol identifier of the input packet, the modified protocol identifier to inform the destination node of the first compression function utilized to compress the input packet.

20. The apparatus of claim 19, wherein the means for selecting is to query the destination node to determine the compression policy of the destination node.

21. The apparatus of claim 19, further including means for storing a list of destination nodes supporting a compression feature.

22. The apparatus of claim 21, wherein the compression feature includes hardware compression of a packet in a node and supporting the compression feature enables hardware compression of a packet in a node.

23. The apparatus of claim 19, further including means for compressing to apply a plurality of compression functions to the input packet, at least one of the plurality of compression functions corresponding to the first compression function that supports the compression policy and reduces a size of the input packet.

24. The apparatus of claim 19, further including means for compressing to utilize hardware compression functions to reduce a size of the input packet, the first compression function indicative of a hardware compression function.

25. The apparatus of claim 19, wherein the means for modifying is to increment unregistered values of the protocol identifier by n, wherein n is a value of one or greater than one and is indicative of a compression function identifier associated with the first compression function utilized to compress the input packet.

26. The apparatus of claim 19, wherein the means for modifying is to increment the protocol identifier by an n-bit difference, where n corresponds to an amount of data in the input packet that was compressed by the first compression function.

\* \* \* \* \*